(12) United States Patent
Luczak

(10) Patent No.: US 10,774,660 B2
(45) Date of Patent: Sep. 15, 2020

(54) BLADE WEDGE ATTACHMENT LAY-UP

(71) Applicant: United Technologies Corporation, Farmington, CT (US)

(72) Inventor: Blake J. Luczak, Pittsburgh, PA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 776 days.

(21) Appl. No.: 15/027,811

(22) PCT Filed: Sep. 26, 2014

(86) PCT No.: PCT/US2014/057614
§ 371 (c)(1),
(2) Date: Apr. 7, 2016

(87) PCT Pub. No.: WO2015/057369
PCT Pub. Date: Apr. 23, 2015

(65) Prior Publication Data
US 2016/0245100 A1 Aug. 25, 2016

Related U.S. Application Data

(60) Provisional application No. 61/890,444, filed on Oct. 14, 2013.

(51) Int. Cl.
*F01D 5/30* (2006.01)
*F01D 5/28* (2006.01)
(Continued)

(52) U.S. Cl.
CPC ........... *F01D 5/3007* (2013.01); *F01D 5/147* (2013.01); *F01D 5/282* (2013.01); *F01D 5/288* (2013.01);
(Continued)

(58) Field of Classification Search
CPC ........ F01D 5/3007; F01D 5/3092; F01D 5/30; F01D 5/14; F01D 5/147
(Continued)

(56) References Cited

U.S. PATENT DOCUMENTS 3,752,600 A 8/1973 Walsh et al.
4,111,606 A * 9/1978 Prewo ..................... C22C 47/00
416/224

(Continued)

FOREIGN PATENT DOCUMENTS

EP 1085172 3/2001
EP 2423440 2/2012
(Continued)

OTHER PUBLICATIONS

The International Preliminary Report on Patentability for PCT Application No. PCT/US2014/057614, dated Apr. 28, 2016.
(Continued)

*Primary Examiner* — Kenneth Bomberg
*Assistant Examiner* — Michael L Sehn
(74) *Attorney, Agent, or Firm* — Carlson, Gaskey & Olds, P.C.

(57) ABSTRACT

A blade for a gas turbine engine includes composite layers including neck plies and tooth plies that are flared relative to the neck plies. The neck plies and tooth plies respectively provide a neck and a root. The root includes a tooth. A Wedge is provided by wedge plies adhered over the root and the tooth.

16 Claims, 2 Drawing Sheets

(51) Int. Cl.
F01D 5/32 (2006.01)
F01D 5/14 (2006.01)

(52) U.S. Cl.
CPC ............ F01D 5/3092 (2013.01); F01D 5/32 (2013.01); F01D 5/323 (2013.01); F01D 5/326 (2013.01); *F05D 2220/32* (2013.01); *F05D 2260/30* (2013.01); *F05D 2300/6032* (2013.01)

(58) Field of Classification Search
USPC ...................................................... 416/219 R
See application file for complete search history.

(56) References Cited

U.S. PATENT DOCUMENTS

| | | | |
|---|---|---|---|
| 4,802,824 A * | 2/1989 | Gastebois | F01D 5/282 416/193 A |
| 5,573,377 A | 11/1996 | Bond et al. | |
| 8,794,925 B2 * | 8/2014 | McCaffrey | F01D 5/282 416/219 R |
| 2008/0187441 A1 | 8/2008 | Schreiber | |
| 2013/0011271 A1 | 1/2013 | Shi et al. | |
| 2013/0247586 A1 | 9/2013 | Luczak | |

FOREIGN PATENT DOCUMENTS

| | | |
|---|---|---|
| GB | 2262966 | 7/1993 |
| JP | 64056902 | 3/1989 |

OTHER PUBLICATIONS

International Search Report and Written Opinion for PCT Application No. PCT/US2014/057614, dated Jan. 8, 2015.
Extended European Search Report for European Patent Application No. 14854284.8 dated Jul. 21, 2017.

* cited by examiner

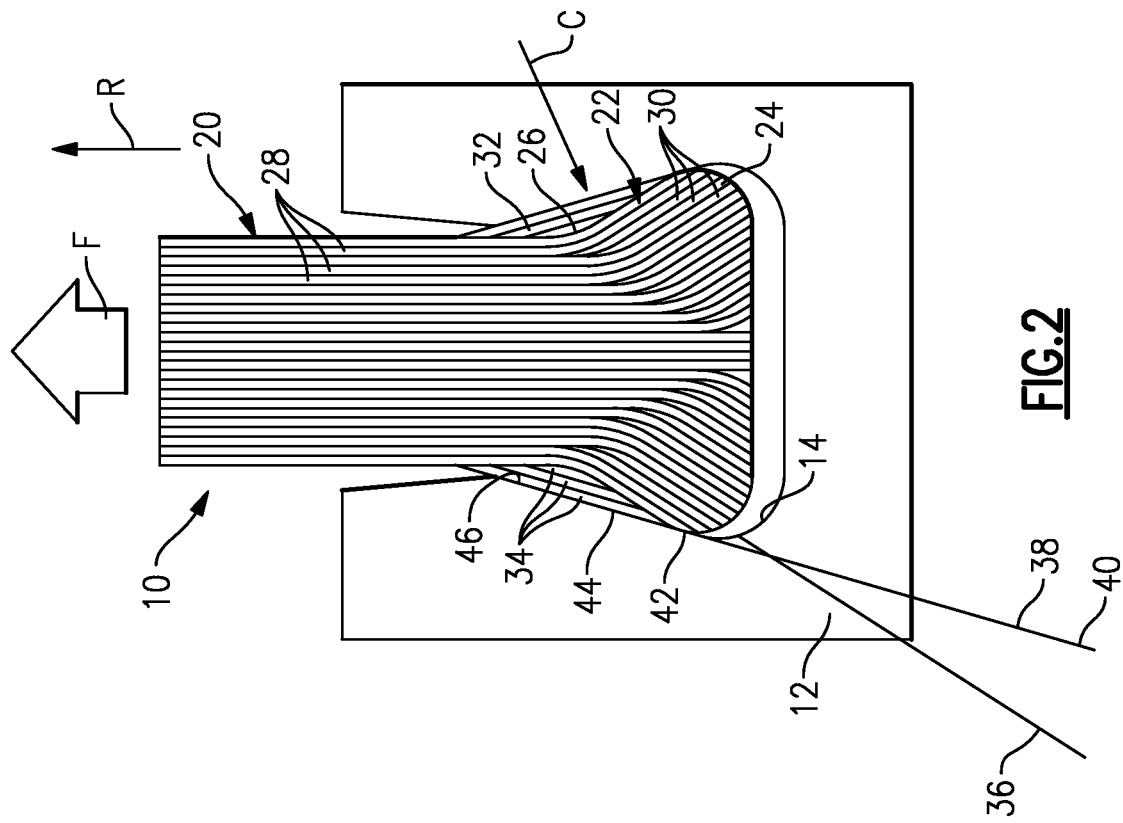
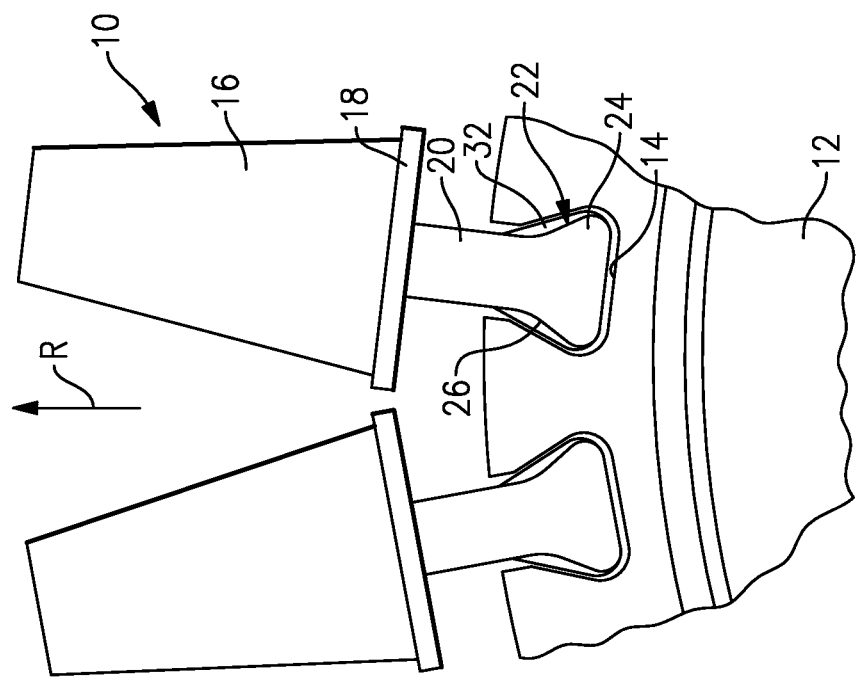

BLADE WEDGE ATTACHMENT LAY-UP

CROSS-REFERENCE TO RELATED APPLICATIONS

This application claims priority to U.S. Provisional Application No. 61/890,444, which was filed on Oct. 14, 2013 and is incorporated herein by reference.

BACKGROUND

This disclosure relates to rotors that have blades which are mounted in slots in a rotor disc. More particularly, the disclosure relates to the lay-up of layers for a blade wedge attachment.

Rotors, such as turbine rotors in gas turbine engines, typically include a disc that has axially extending slots around its periphery for mounting turbine blades. The slots have a "toothed" profile and each of the blades has a root with a corresponding profile to interlock with the toothed profile of the slots. In applications in which the blade is constructed from multiple layers forming a ceramic matrix composite, the root typically is provided by a simple dovetail geometry.

Typically, the rotor is joined to an airfoil of the blade through a relatively narrow neck and root joined at a fillet. One challenge in securing the blades is that during operation, stresses on the blade can be concentrated at a relatively narrow neck and fillet. Another challenge is that interlaminar stresses in the CMC can cause delamination between the layers.

One technique for mitigating stress is to secure metallic pads near the neck and fillet. Another technique for mitigating stress is to provide wedges that float with respect to the slot and the blade tooth.

SUMMARY

In one exemplary embodiment, a blade for a gas turbine engine includes composite layers including neck plies and tooth plies that are flared relative to the neck plies. The neck plies and tooth plies respectively provide a neck and a root. The root includes a tooth. A wedge is provided by wedge plies adhered over the root and the tooth.

In a further embodiment of the above, the composite layers are provided by a matrix composite material.

In a further embodiment of any of the above, the matrix composite material is integrated with fibers.

In a further embodiment of any of the above, the neck plies, the tooth plies and the wedge plies are integrated into a unitary matrix composite structure.

In a further embodiment of any of the above, the neck plies extend in a radial direction to provide an airfoil.

In a further embodiment of any of the above, neck plies include a matrix composite material having fibers that extend in the radial direction. The wedge plies include a matrix composite material having fibers that extend in a direction transverse to the radial direction.

In a further embodiment of any of the above, the tooth plies are arranged at a tooth ply angle. The wedge plies are arranged at a wedge ply angle. The wedge ply angle is at an angle that lies between the radial direction and the tooth ply angle.

In a further embodiment of any of the above, the wedge plies are constructed from a different material than the tooth plies.

In a further embodiment of any of the above, the wedge plies extend axially to an end face of the root.

In a further embodiment of any of the above, the wedge plies have a different thickness than the tooth plies.

In a further embodiment of any of the above, the wedge plies extend from a tangent point on the tooth to the neck.

In a further embodiment of any of the above, the wedge is covered in a coating.

In a further embodiment of any of the above, the wedge includes a crowned feature.

In another exemplary embodiment, a rotating stage of a gas turbine engine includes a rotor including a slot and a blade having a root received in the slot. The blade has composite layers including neck plies and tooth plies that are flared relative to the neck plies. The neck plies and tooth plies respectively provide a neck and a root. The root includes a tooth. A wedge is provided by wedge plies adhered over the root and the tooth. The wedges are configured to transfer a pulling load on the blade to the rotor.

In a further embodiment of the above, the composite layers are provided by a matrix composite material. The matrix composite material is integrated with fibers. The neck plies, the tooth plies and the wedge plies are integrated into a unitary matrix composite structure.

In a further embodiment of any of the above, the neck plies extend in a radial direction to provide an airfoil. The neck plies include a matrix composite material having fibers that extend in the radial direction. The wedge plies include a matrix composite material that has fibers that extend in a direction transverse to the radial direction.

In a further embodiment of any of the above, the tooth plies are arranged at a tooth ply angle. The wedge plies are arranged at a wedge ply angle. The wedge ply angle is at an angle that lies between a radial direction of the blade and the tooth ply angle.

In a further embodiment of any of the above, the wedge plies extend axially to an end face of the root.

In a further embodiment of any of the above, the wedge plies extend from a tangent point on the tooth to the neck.

In a further embodiment of any of the above, the wedges include at least one of a coating and a crowned feature.

BRIEF DESCRIPTION OF THE DRAWINGS

The disclosure can be further understood by reference to the following detailed description when considered in connection with the accompanying drawings wherein:

FIG. 1 schematically illustrates an example rotor having blades mounted thereto.

FIG. 2 illustrates a blade in a slot of the rotor and wedges adhered to a root of the blade.

Figure 3:
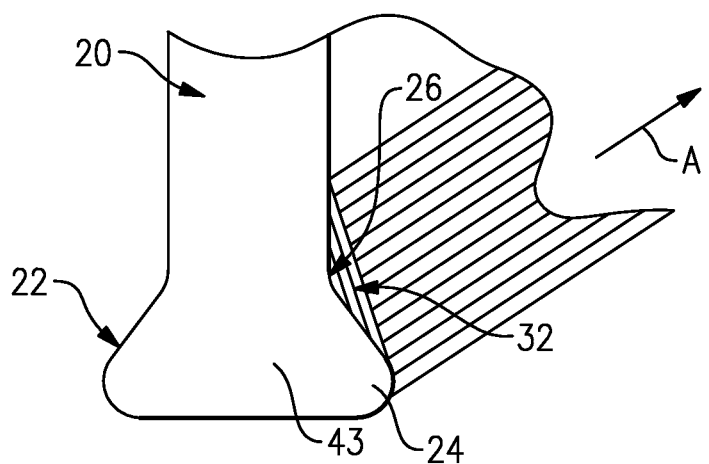
FIG. 3 is a perspective view of one wedge.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Referring to FIG. 1, blades 10 are shown supported on a rotor 12 within slots 14. The blade 10 includes an airfoil 16 extending in a radial direction R from a platform 18. The platform 18 is supported by a neck 20 and provides an inner gas flow path surface of a core flow path within a gas turbine engine. A root 22 is provided on the neck 20 opposite the platform 18. The platform may be omitted if desired. The root 22, which has a dovetail shape in the example, is received in the slot 14. The root 22 includes circumferentially spaced apart teeth 24, which transfer the pulling force F (FIG. 2) on the blade 10 to the rotor 12. A fillet 26 is provided at the intersection of each tooth 24 and neck 20 to provide a smooth transition between these features. It should be understood that other blade and rotor arrangements may be used.

Referring to FIG. 2, the neck 20 includes neck plies 28 extending in the radial direction R and may also provide the airfoil 16 (FIG. 1). The neck plies 28 are flared outward to provide the teeth 24 formed by tooth plies 30. The tooth plies 30 may include short composite plies arranged in the root 22 to provide the flared dovetail shape.

In one example method of manufacture, fibers are arranged in a layer. In one example, multiple layers are stacked into plies, and the neck and tooth plies are arranged about a form in the shape of an article. The layers can be processes in any suitable manner to produce an organic matrix composite (OMC) or a ceramic matrix composite (CMC) blade.

During manufacture of the blade, additional plies of material are applied to the blade 10. The wedge plies 34 are constructed from layers that may be provided by the same material as the neck and tooth plies 28, 30 or a different material. Moreover, the neck and tooth plies 28, 30 and the wedge plies 34 may be provided by different ply thicknesses. In the example, a wedge 32 is adhered to each circumferential side of the blade 10, such that the wedges 32 are integrated in the rest of the blade structure. In an example, the wedge 32 includes wedge plies 34 that are arranged at the fillets 26 and overlap the teeth 24 and the neck 20. In the example, the wedge plies 34 extend from a tangent point 42 on the teeth 24 to the neck 20.

As shown in FIG. 2, the tooth plies 30 are arranged at a tooth ply angle 36, and the wedge plies 34 are arranged at a wedge ply angle 40. In an example, the wedge ply angle 40 is the same as the slot angle 38. The wedge ply angle 40 is at an angle that lies between the radial direction R (0° angle) and the tooth ply angle 38.

The wedges 32 each provide a wedge surface 44 that engages a slot surface 46 of the slot 14, which is arranged at the slot angle 38. The wedges 32 create a compressive load C on the teeth 24 and, therefore, the tooth plies 30, to force the tooth plies 30 into further engagement with one another and prevent delamination of the plies during engine operation.

In the loaded condition when the rotor 12 is rotating, the blade 10 moves radially outwardly relative to the engines central axis such that the wedges 32 are more fully engaged with the slot 14. In this regard, the blades 10 and rotor 12 may be designed with relatively tight tolerances and with relatively smooth surface finishes to reduce friction. In one example, the surface finishes are 63 microinches (1.6 micrometer) or less.

In one example shown in FIG. 3, the wedges 32 extend up to an end face 43 of the root 22. Alternatively, the wedges 32 may be spaced from or recessed relative to the end face 43.

The fibers of the neck plies 28 may be oriented in the radial direction R. The fibers of the wedge plies 34 may be arranged transversely to those of the neck plies 28, for example, in a generally axial direction A.

Figure 4:
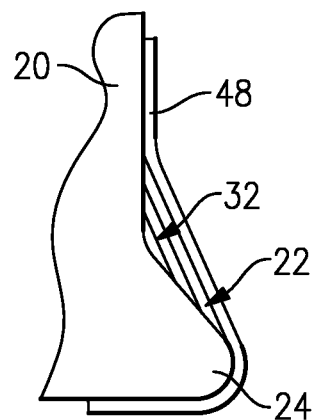
FIG. 4 is an end view of the wedge and the root with a coating provided over the wedge.

A coating 48 may be provided over the wedge 32, as shown in FIG. 4. The coating 48 may extend beyond the wedge 32 and along a portion of the neck 20 and/or root 22. The coating 48 is designed to enhance the function of the wedge 32. For instance, the coating 48 may be lubricious to reduce friction, hard to reduce wear and/or have chemical properties to enhance durability in particular environmental conditions. For example, the coating 48 is selected from silicon metal, gold, ceramic, metal alloy or composite materials that include reinforcement elements dispersed within a matrix material.

Figure 5:
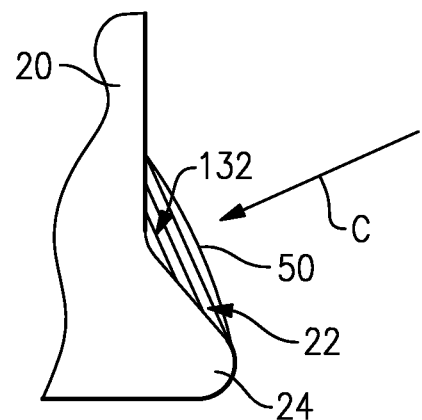
FIG. 5 is another end view of the wedge and the root, with the wedge having a crown.

The wedge 132 may include one or more crowned features 50 to provide a raised area which concentrates the compressive force C at the crowned feature 50, as shown in FIG. 5. Each wedge 132 may include more than one crowned feature 50, if desired.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A blade for a gas turbine engine comprising:
   composite layers including neck plies and tooth plies that are flared relative to the neck plies, the neck plies and tooth plies respectively providing a neck and a root, the root including a tooth;
   a wedge provided by wedge plies adhered over the root and the tooth;
   the neck plies extend in a radial direction to provide an airfoil; and
   all of the tooth plies are arranged at a tooth ply angle, and the wedge plies are arranged at a wedge ply angle, the wedge ply angle is at an angle that lies between the radial direction and the tooth ply angle.

2. The blade according to claim 1, wherein the composite layers are provided by a matrix composite material.

3. The blade according to claim 2, wherein the matrix composite material is integrated with fibers.

4. The blade according to claim 2, wherein the neck plies, the tooth plies and the wedge plies are integrated into a unitary matrix composite structure.

5. The blade according to claim 1, wherein neck plies include a matrix composite material having fibers extending in the radial direction, and the wedge plies include a matrix composite material having fibers extending in a direction transverse to the radial direction.

6. The blade according to claim 1, wherein the wedge plies extend axially to an end face of the root.

7. The blade according to claim 1, wherein the wedge plies have a different thickness than the tooth plies.

8. The blade according to claim 1, wherein the wedge plies extend from a tangent point on the tooth to the neck.

9. The blade according to claim 1, wherein the wedge is covered in a coating.

10. The blade according to claim 1, wherein the wedge includes a crowned feature.

11. A rotating stage of a gas turbine engine comprising:
a rotor including a slot;
a blade having a root received in the slot, the blade having composite layers including neck plies and tooth plies that are flared relative to the neck plies, the neck plies and tooth plies respectively providing a neck and a root, the root including a tooth, and a wedge provided by wedge plies adhered over the root and the tooth, the wedge configured to transfer a pulling load on the blade to the rotor; and
all of the tooth plies are arranged at a tooth ply angle, and the wedge plies are arranged at a wedge ply angle, the wedge ply angle is at an angle that lies between a radial direction of the blade and the tooth ply angle.

12. The rotating stage according to claim 11, wherein the composite layers are provided by a matrix composite material, the matrix composite material is integrated with fibers, wherein the neck plies, the tooth plies and the wedge plies are integrated into a unitary matrix composite structure.

13. The rotating stage according to claim 11, wherein the neck plies extend in a radial direction to provide an airfoil, and the neck plies include a matrix composite material having fibers extending in the radial direction, and the wedge plies include a matrix composite material having fibers extending in a direction transverse to the radial direction.

14. The rotating stage according to claim 11, wherein the wedge plies extend axially to an end face of the root.

15. The rotating stage according to claim 11, wherein the wedge plies extend from a tangent point on the tooth to the neck.

16. The rotating stage according to claim 11, wherein the wedge includes at least one of a coating and a crowned feature.

* * * * *